United States Patent [19]
Janusz et al.

[11] Patent Number: 5,302,068
[45] Date of Patent: Apr. 12, 1994

[54] FASTENER HAVING RECESSED, NON-CIRCULAR HEAD, AND FASTENER-DRIVING TOOL

[75] Inventors: Michael Janusz, Elgin; George G. Dewey, Prospect Heights, both of Ill.

[73] Assignee: Illinois Tool Works Inc., Glenview, Ill.

[21] Appl. No.: 7,887

[22] Filed: Jan. 22, 1993

Related U.S. Application Data

[60] Division of Ser. No. 908,751, Jul. 6, 1992, which is a continuation-in-part of Ser. No. 592,129, Oct. 3, 1990, abandoned.

[51] Int. Cl.⁵ .................. F16B 23/00; F16B 35/06
[52] U.S. Cl. .................. 411/402; 411/410; 411/919
[58] Field of Search ................ 411/402–404, 411/407, 410, 919; 81/437, 451

[56] References Cited

U.S. PATENT DOCUMENTS

| | | | |
|---|---|---|---|
| 2,353,531 | 7/1944 | Whitney | 411/410 |
| 3,283,638 | 11/1966 | Ansingh | 411/410 |
| 3,396,765 | 8/1968 | Ridenour | 81/437 |
| 3,888,144 | 6/1975 | Parsons | 81/451 X |
| 4,674,367 | 6/1987 | Aab et al. | |

FOREIGN PATENT DOCUMENTS

| | | | |
|---|---|---|---|
| 164318 | 12/1985 | European Pat. Off. | 411/403 |
| 2361568 | 3/1973 | France | 411/410 |

*Primary Examiner*—Neill R. Wilson
*Attorney, Agent, or Firm*—Schwartz & Weinrieb

[57] ABSTRACT

An improved fastener having a non-circular head with a concave recess providing a datum useful in centering the head relative to a non-circular socket of a driving member is disclosed. The recess may have a frusto-conical wall defining an upper, circular edge or substantially triangular walls defining an upper, non-circular edge. An improved tool useful to drive the improved fastener is also disclosed. In the improved tool, a driving member has a tubular extension with a non-circular socket, and a centering pin is axially movable toward and extended position, in which a convex end of the centering pin fits into the concave recess of the screw head when the socket of the tool extension is axially fitted over the fastener head. The centering pin is biased toward the extended position.

13 Claims, 3 Drawing Sheets

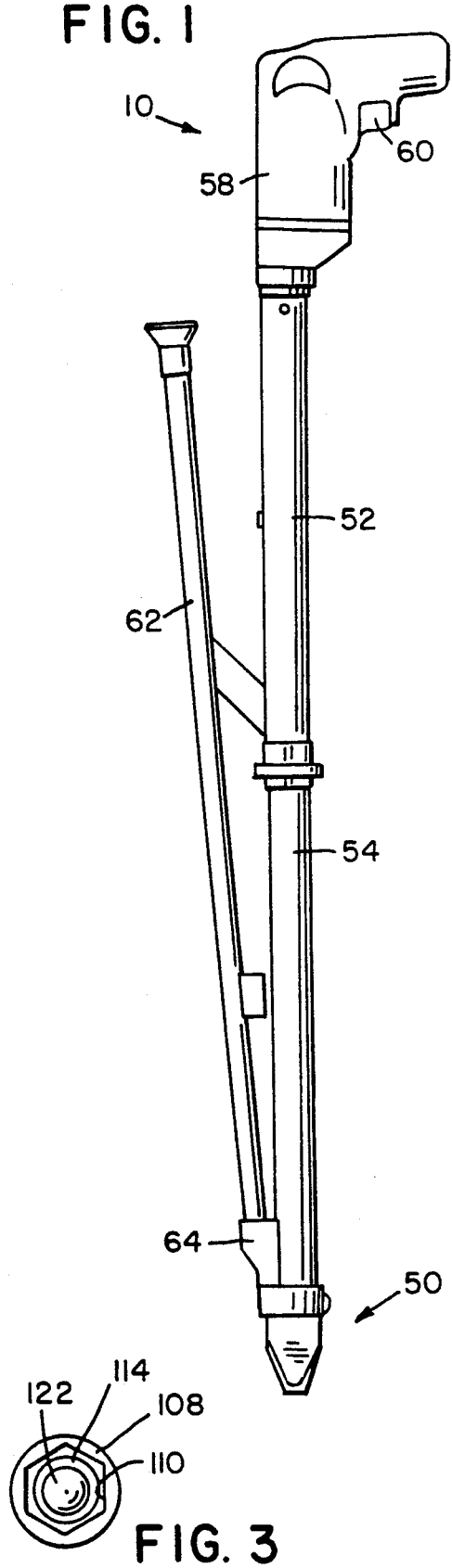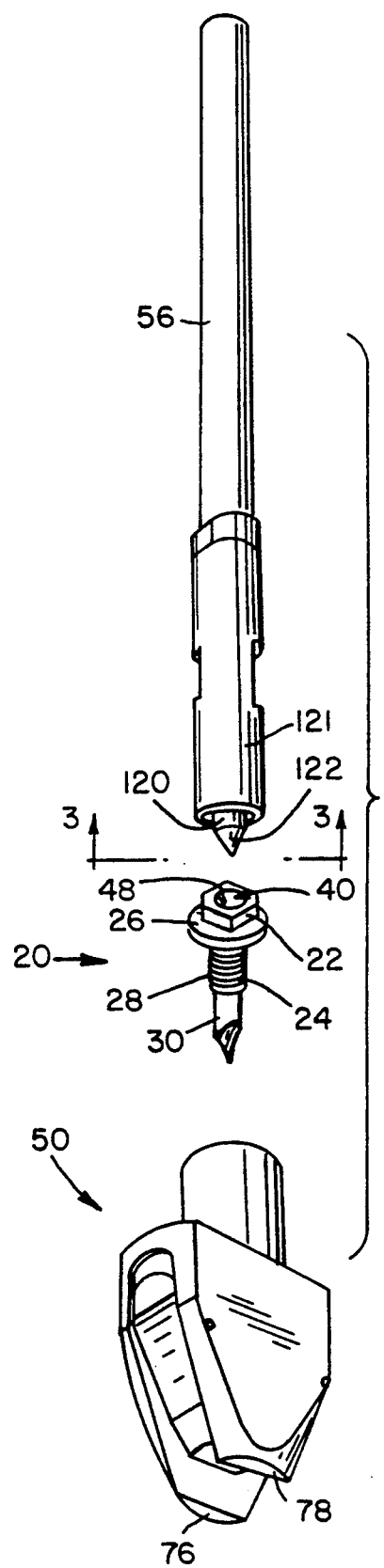

FASTENER HAVING RECESSED, NON-CIRCULAR HEAD, AND FASTENER-DRIVING TOOL

This application is a division of application Ser. No. 908,751, filed Jul. 6, 1992, which, in turn, is a continuation application of Ser. No. 592,129 filed Oct. 3, 1990, now abandoned, Ser. No. 592,129 filed Oct. 3, 1990, now abandoned.

TECHNICAL FIELD OF THE INVENTION

This invention pertains to an improved fastener having a non-circular or polygonal head and a shank with a threaded portion, such as, for example, a screw having a hexagonal head and a shank with a threaded portion and a drilling tip, and to a fastener-driving tool having a non-circular or polygonal socket for driving such a fastener. This invention provides an improved mechanism to center the non-circular socket and the non-circular head relative to each other by means of a centering pin coacting with a concave recess defined within the non-circular head.

BACKGROUND OF THE INVENTION

So-called stand-up screw guns, which are powered by means of trigger-actuated, electric motors, are exemplified in Murray U.S. Pat. No. 3,960,191, Dewey U.S. Pat. No. 4,236,555, and Dewey U.S. Pat. No. 4,397,412 and are available commercially from ITW-Buildex (a unit of Illinois Tool Works Inc.) of Itasca, Ill., under its AUTOTRAXX trademark.

Typically, stand-up screw guns employ driving members with driving tips, such as, for example, driving tips adapted to drive Phillips-head screws. Fastener-driving tools of other types, which may be powered by means of electric motors or by means of pneumatic motors, employ driving members with driving sockets, which fit axially over conforming heads of the fasteners, such as, for example, screws or bolts. Typically, the sockets and fastener heads are non-circular or polygonal when viewed axially. Commonly, the sockets and fastener heads are hexagonal when viewed axially.

Often, it is difficult for a user to center the non-circular socket of such a tool and the non-circular head of such a fastener, particularly if a stand-up screw gun is used. Although a bolt or machine screw can be manually started by means of rotating the same several turns into a prethreaded hole performed within a workpiece, it is difficult for a user to stabilize a screw having a non-circular head and having a drilling or tapping tip before the screw has been driven several turns into a workpiece. Centering of the non-circular socket of a fastener-driving tool and the non-circular head of such a screw can therefore be especially difficult for a user to achieve.

If the non-circular socket of such a fastener-driving tool and the non-circular head of such a fastener are not centered relative to each other, it is possible for the fastener, the workpiece, or both to be damaged if an attempt is made to drive the fastener into the workpiece by means of the fastener-driving tool. The non-circular socket may also be damaged.

Therefore, there has been a need, to which this invention is addressed, for an improved mechanism to center the non-circular socket of such a fastener-driving tool and the non-circular head of such a fastener relative to each other.

SUMMARY OF THE INVENTION

This invention provides an improved fastener having a head that is non-circular when viewed axially. Moveover, this invention provides improvements in a fastener-driving tool having a driving member with a socket that is non-circular when viewed axially, whereby the improved tool is useful for driving the improved fastener. This invention facilitates the centering of the non-circular socket of the improved tool and the non-circular socket of the improved tool and the non-circular head of the improved fastener relative to each other by means of a centering pin coating with a concave recess formed within the non-circular head of the fastener.

The improved fastener, which has a longitudinal axis, has a head and a shank which has a threaded portion. The shank may be fully threaded or may be alternatively provided with a drilling or tapping tip. It is preferred for the shank to have a drilling tip. The head is non-circular, preferably hexagonal, when viewed axially, so as to adapt the head to coat with a driving member having a suitably shaped socket defined within a fastener-driving tool, such as, for example a stand-up screw gun or a hand-held screw gun. The head is therefore adapted, to coact with the non-circular socket of the driving member of the improved tool.

The head of the improved fastener has a concave recess extending axially into the head. The concave recess defines a continuous, upper edge, which conforms preferably to a circle or alternately to a regular polygon. The concave recess is therefore readily distinguished from a slotted, cross-shaped, or other similarly configured recess designed to receive a screwdriver blade. The concave recess provides a datum useful in centering the non-circular socket of the driving member of a fastener-driving tool, as discussed in the preceding paragraph, and the non-circular head of the improved fastener relative to each other. Moreover, as explained below, the concave recess permits the fastener to coact with a centering pin associated with such a driving member.

In a preferred embodiment of the improved fastener, the concave recess has a frusto-conical surface, which is coaxial with the fastener. The frusto-conical surface defines a continuous, upper edge, which conforms to a circle.

In an alternate embodiment of the this invention, the concave recess has a plurality of substantially triangular surfaces, which are arranged in a regular array about the axis of the fastener. The substantially triangular surfaces define a continuous, upper edge, which conforms to a regular polygon. Preferably, in such an embodiment, the concave recess has six of such surfaces defining a continuous, upper edge conforming to a regular hexagon.

The improved tool comprises a novel combination of a driving member and a centering pin assembled to the driving member for axial movement of the centering pin relative to the driving member. The improved tool is useful to drive the improved fastener.

The driving member, which has a longitudinal axis, has a tubular extension with a socket extending axially into the tubular extension and being non-circular when viewed axially. The socket, which conforms generally to the non-circular head of the improved fastener, is adapted to be axially fitted over such head so as to define a driving relationship therewith, and by means of the driving member is arranged to drive such fastener.

The centering pin, which has a longitudinal axis coinciding generally with the axis of the driving member, is mounted upon the driving member so as to permit axial movement of the centering pin between an extended position and a retracted position. The centering pin is biased toward the extended position. The centering pin, which a convex end, extends axially through the socket when the same is at the extended position but is retracted axially in the retracted position. The centering pin is adapted to fit at the convex end into the concave recess defined within the head of the improved fastener and to be axially moved from the extended position to one of a plurality of retracted positions so as to center the socket and the fastener head relative to each other.

The driving member is movable between an inoperative position, in which the centering pin is spaced from the fastener head, and an operative position, in which the centering pin is fitted at the convex end into the concave recess defined within the fastener head and is moved axially from the extended position to one of the retracted positions. Accordingly, as the driving member is moved to the operative position, the socket and the fastener head are centered relative to each other.

In a preferred embodiment of the improved tool, the convex end of the centering pin has a frusto-conical surface, which converges toward the axis of the centering pin. Thus, the improved tool has particular utility to drive the improved fastener if the concave recess defined within the fastener head has a frusto-conical surface, although the frusto-conical surface of the convex end of the centering pin can also be used if the concave recess has a plurality of substantially triangular facets.

In an alternate embodiment of the improved tool, the convex end of the centering pin has a plurality of substantially triangular facets, which are arranged in a regular array about the axis of the centering pin. The substantially triangular facets converge toward the axis of the centering pin. Preferably, in such an embodiment, the convex end of the centering pin has six of such facets conforming substantially to a pyramid having a hexagonal base. Thus, the improved tool has particular utility to drive the improved fastener if the concave recess defined within the fastener head has a similar array of substantially triangular surfaces, whereupon the socket and the fastener head are oriented similarly in a rotational sense about their respective axes when centered relative to each other.

In a preferred construction, the tubular extension is connected mechanically to the driving member, and an annular retainer is disposed within the tubular extension. The retainer, which may be press-fitted into the tubular extension, has a central aperture, through which the centering pin extends for axial movement of the centering pin relative to the retainer. In the preferred construction, the centering pin has an annular rib, which is disposed within the tubular extension. The rib is adapted to engage the retainer upon axial movement of the centering pin to the extended position. Moreover, in the preferred construction, the centering pin is biased by means of a coiled spring disposed within the tubular extension so as to bear against the rib.

BRIEF DESCRIPTION OF THE DRAWINGS

These and other objects, features, and advantages of this invention will become evident from the following description of preferred embodiments of the improved fastener and the improved tool, with reference to the accompanying drawings, in which like reference characters designate like or corresponding parts throughout the several views, and wherein:

FIG. 1 is an elevational view of a stand-up screw gun constituting a preferred embodiment of the improved tool.

FIG. 2, on a larger scale, is a fragmentary, exploded view of some components of the stand-up screw gun shown in FIG. 1, along with a screw constituting a preferred embodiment of the improved fastener.

FIG. 3 is an axial view of some components shown in FIG. 2, namely a driving member with a non-circular socket and a centering pin, as taken along line 3—3 of FIG. 2, in a direction indicated by means of the arrows.

DETAILED DESCRIPTION OF PREFERRED EMBODIMENTS

Figure 4:
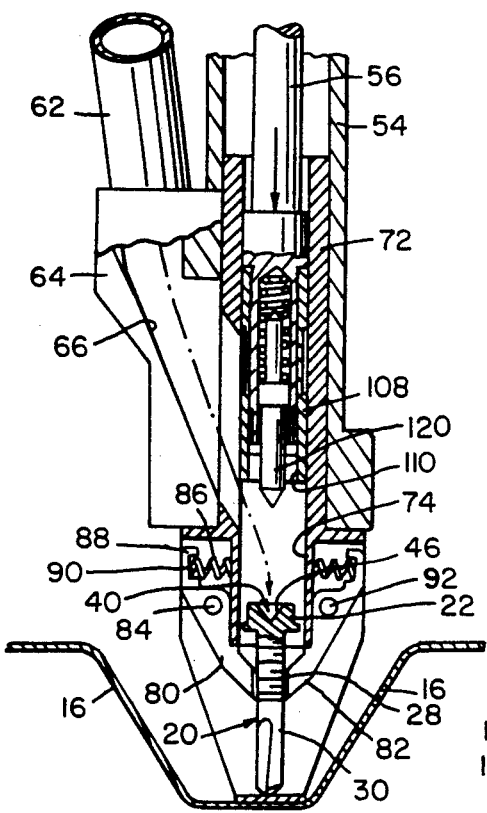
FIG. 4, on a similar scale, and FIGS. 5 through 8, on a larger scale, are sequential, fragmentary views through some components of the stand-up screw gun shown in FIGS. 1, 2, and 3, as used to drive the screw shown in FIG. 2 through two decking members at an overlapped seam, and into one flange of an I-beam, which is shown only in FIG. 8. Some elements shown in FIG. 4 are omitted in FIGS. 5 through 8.

Although preferred and alternate embodiments of the improved tool and the improved fastener are illustrated in the drawings and are to be subsequently described, it is to be here understood that this invention is not limited to these embodiments.

As shown in FIG. 1 and other views, a stand-up screw-gun 10 constitutes a preferred embodiment of the improved tool provided by means of this invention. As shown in FIGS. 2 and 4 through 8, the screw gun 10 is useful to drive a screw through two decking members 14, 16, at an overlapped seam, and into one flange 18 of an I-beam, as is conventional in a floor or roof construction. The screw gun 10 is shown as used to drive a screw 20 constituting a preferred embodiment of the novel fastener provided by means of this invention.

Except as illustrated in the drawings and described herein, the screw 20 is similar to the screw disclosed in Sygnator U.S. Pat. No. 4,583,898.

Thus, the screw 20, which has a longitudinal axis, has a head 22, a shank 24, and a washer-like portion 26 interposed between the head 22 and the shank 24. The head 22 is hexagonal when viewed axially, so as to adapt the head 22 to coact with a suitably shaped socket of a fastener-driving tool, such as, for example, the socket of the screw gun 10 to be later described. The shank 24 has a threaded portion 28 adjoining the washer-like portion 26 and a drilling tip 30 adjoining the washer-like portion 26 and a drilling tip 30 adjoining the threaded portion 28. Details of a drilling tip similar to the drilling tip 30 are found in the Sygnator patent noted above.

The screw 20 differs from the screw disclosed in the Sygnator patent noted above, and from other fasteners known heretofore, in having a concave recess 40 extending axially into the head 22, from a top surface 42 of the head 22. It is characteristic of the preferred embodiment of the novel fastener provided by means of this invention that the concave recess 40 has a frusto-conical surface 46 defining a conical angle and converging toward the axis of the screw 20. It is not necessary for the frusto-conical surface 46 to converge to a point upon the screw 20. At the top surface 42 of the head 22, the frusto-conical surface 46 defines a continuous, upper edge 48 conforming to a circle.

Advantageously, the concave recess 40 provides a datum that is useful in centering a socket of a fastener-driving tool, such as, for example, the screw gun 10 to be described next, and the screw head 22 relative to each other before the fastener-driving tool is used to drive the screw 20.

Except as illustrated in the drawings and described herein, the screw gun 10 is generally similar to stand-up screw guns disclosed in the Murray and Dewey patents noted above and more specifically to stand-up screw guns available commercially from ITW-Buildex, supra, under its ACCUTRAXX trademark.

Broadly, the screw gun 10 comprises a nosepiece 50 having various components to be described later, two tubes disposed in a telescoping relationship, namely an outer, upper tube 52 and an inner, lower tube 54 mounting the nosepiece 50, a driving member 56 rotatably mounted within the tubes 52, 54, and arranged to drive other components to be described later, and a driver 58 mounted upon the upper tube 52. The driver 58 is powered by means of an electric motor (not shown) and is arranged to be manually actuated by means of a trigger 60 so as to drive the driving member 56 rotationally when actuated. The tubes 52, 54, are biased by means of internal springs (not shown) to an elongate condition. The tubes 52, 54, are adapted to be axially telescoped to a shortened, telescoped or contracted condition, when a user presses downwardly upon the driver 58 with the nosepiece 50 pressed against a workpiece.

Furthermore, the screw gun 10 comprises a screw-feeding tube 62, which is mounted upon the nosepiece 50 by means of a mounting block 64 having a passageway 66 for guiding screws from the screw-feeding tube 62 into the nosepiece 50. Each screw must be individually dropped into the screw-feeding tube 62 in such a manner that the shank of such screw leads the head of such screw.

The nosepiece 50 has an upper, tubular portion 72 arranged to receive each screw from the passageway 66, a lower, tubular portion 74, and a pair of lower flanges 76, 78, disposed upon opposite sides of the tubular portion 74. The flanges 76, 78, extend below the tubular portion 74 and are designed to be pressed downwardly against a workpiece when the screw gun 10 is used to drive a screw into or through the workpiece.

The nosepiece 50 has a pair of gripping jaws 80, 82, which are mounted between the flanges 76, 78, for pivotal movement of each of the jaws 80, 82, between a closed position and an open position. Each of the jaws 80, 82 is shown in its closed position in FIGS. 4 through 7 and in one of its opened positions in FIG. 8. The gripping jaw 80 is mounted for pivotal movement upon a pivot pin 84, which is mounted upon the flanges 76, 78, and is biased to its closed position by means of a coiled spring 86. The spring 86 is operatively disposed between an upper end 88 of the jaw 80 and the tubular portion 74 of the nosepiece 50. The end 88 of the jaw 80 has a pocket 90 for receiving one end of the coiled spring 86. The gripping jaw 82 is mounted for pivotal movement upon a pivot pin 92, which is mounted upon the flanges 76, 78, and is biased to its closed position by means of a coiled spring 94. The spring 94 is operatively disposed between an upper end 96 of the jaw 82 and the tubular portion 74 of the nosepiece 50. The end 96 of the jaw 82 has a pocket 98 for receiving one end of the coiled spring 94.

When each of the gripping jaws 80, 82, is in its closed position, the jaws 80, 82, are disposed loosely so as to grip the shank of a screw, the shank 24 of the screw 20 being shown as being gripped loosely in FIGS. 4 through 7, and furthermore to prevent the head of the screw from dropping through the jaws 80, 82, if the nosepiece is not disposed against a workpiece. Pivotal movement of the jaw 80, as biased by means of the spring 86, is limited by engagement defined between a shoulder 100 upon the jaw 80 and the tubular portion 74 of the nosepiece 50. Pivotal movement of the jaw 82, as biased by means of the spring 94, is limited by engagement defined between a shoulder 102 upon the jaw 82 and such tubular portion 74.

The driving member 56, which has a longitudinal axis, has a tubular extension 108. The tubular extension 108 defines a socket 110 extending axially into the tubular extension 108. The socket 110 is hexagonal when viewed axially, conforms generally to the head 22 of the screw 20, and is adapted to be axially fitted over the screw head 22. The tubular extension 108 is mechanically connected to the driving member 56, by having a partly threaded portion 112 threaded onto a partly threaded, tubular portion 114 of the driving member 56.

Figure 5:
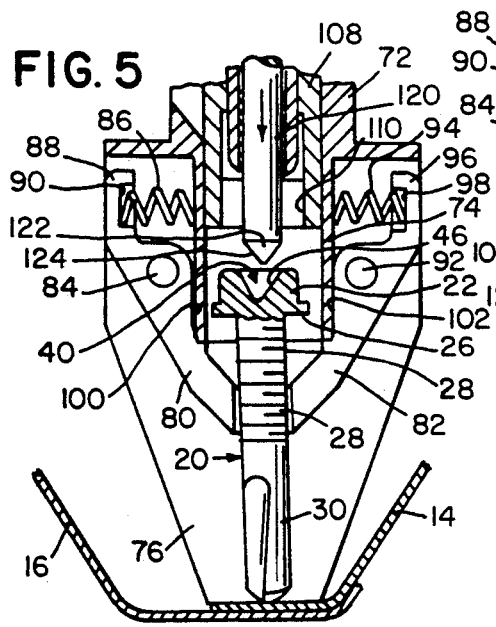
Figure 6:
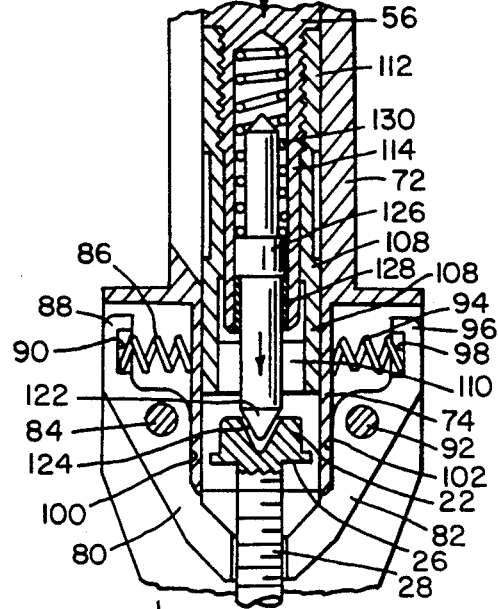

A centering pin 120, which has an axis that coincides generally with the axis of the driving member 56, is disposed within the tubular portion 114 of the driving member 56 for axial movement of the centering pin 120 relative to the driving member 56 between an extended position and a retracted position. In the extended position, the centering pin 120 extends axially through the socket 110, as shown in FIGS. 4, 5, and 6. The centering pin 120 is shown in a retracted position in FIGS. 7 and 8.

The centering pin 120 has a convex end 122 having a frusto-conical surface 124 converging toward the axis of the centering pin 120. The frusto-conical surface 124 defines a conical angle that, preferably, is substantially equal to but not greater than the conical angle defined by means of the frusto-conical surface 46 of the concave recess 40 defined within the head 122 of the screw 20.

The centering pin 120 has an annular rib 126, which is disposed within the tubular portion 114 of the driving member 56. An annular retainer 128 is pressed into the tubular portion 114, below the annular rib 126, in such a manner that the retainer 128 is frictionally held within by the tubular portion 114. The rib 126 is adapted to engage the retainer 128 upon axial movement of the centering pin 120 to the extended position. Thus, the retainer 128 retains the rib 126, so as to prevent the centering pin 120 from dropping out from the tubular portion 114. A coiled spring 130 is disposed within the tubular portion 114, around the centering pin 120, so as to bear downwardly against the rib 126 and therefore bias the centering pin 120 toward the extended position.

The centering pin 120 is adapted to be axially fitted at the convex end 122 into the concave recess 40 defined within the head 22 of the screw 20. Also, the centering pin 120 is adapted to be axially moved from the extended position to a retracted position when pressed upwardly into the tubular extension 108. The centering pin 120 is used to center the socket 110 and the screw head 22 relative to each other.

The driving member 56 is movable between inoperative positions, in which the centering pin 120 is spaced from the head 22 of the screw 20, and an operative position. In the operative position, the centering pin 120 is axially fitted at the convex end 22 into the concave recess 40 defined within the screw head 22 and is moved axially from the extended position to a retracted position, whereby the centering pin 120 centers the socket 110 and the screw head 22 relative to each other.

Figure 7:
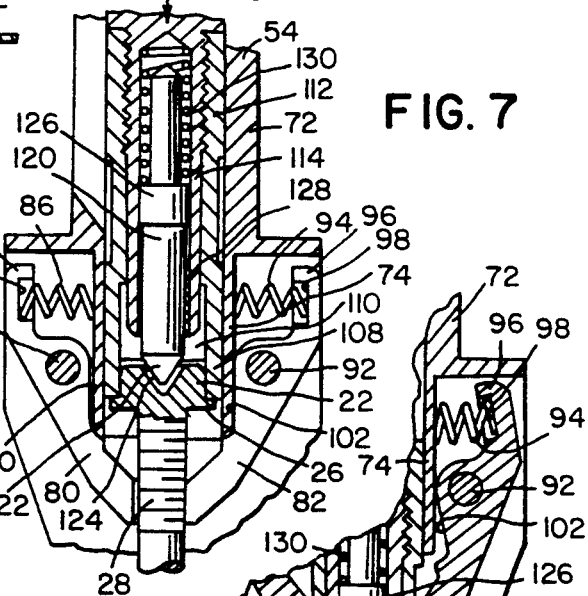
Figure 8:
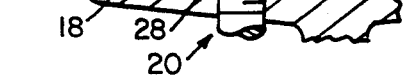

When the driving member 56 has been moved to the operative position by means of a user pressing downwardly upon the driver 58 and telescoping the tubes 52, 54, to the shortened condition with the nosepiece 50 pressed against a workpiece, such as, for example, the decking member 14 shown in FIG. 8 and other views, the screw gun 10 may then be actuated so as to drive the screw 20 by means of the driving member 56 with the socket 110 axially fitted over the head 22 of the screw 20, as illustrated in sequential stages in FIGS. 4 through 8. As shown in FIGS. 6, 7, and 8, the convex end 122 is loosely inserted into the concave recess 40, so as not to impart frictional drag as the screw 20 is driven. Moreover, as shown in FIG. 8, the tubular extension 108 engages the washer-like portion 26 of the screw 20 after the socket 110 has been axially fitted over the head 22 of the screw 20, so as to limit axial movement of the socket 110 over the head 22 of the screw 20.

If the screw 20 should be slightly tipped, as suggested in FIG. 5, and if the centering pin 120 were omitted, a user could face some difficulty in axially fitting the socket 110 over the head 22 of the screw 20. Advantageously, the centering pin 120 facilitates centering the socket 110 and the screw head 22 relative to each other, so as to obviate such difficulty.

Figure 9:
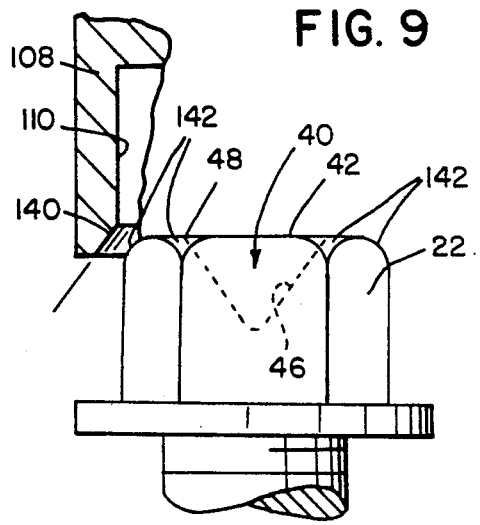
FIG. 9 is an enlarged, fragmentary, elevational detail of a modified socket coacting with the screw shown in FIG. 2.

As shown in FIG. 9, one possible enhancement of this invention is to chamfer lower edges 140 defined upon the free end of the extension 108 defining the entrance to the socket 110. Upper corners 142 defined by means of the head 22 of the screw are rounded in a known manner. The chamfered edges 140 and the rounded corners 142 facilitate centering the socket 110 and the screw head 22 relative to each other.

Figure 10:
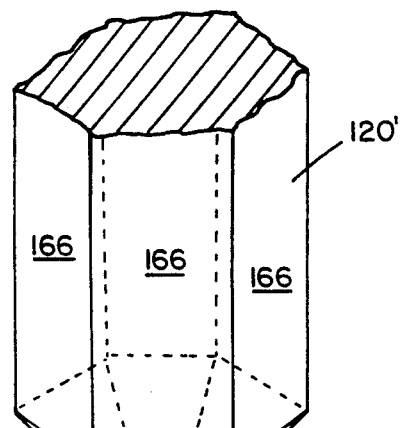
FIG. 10 is an enlarged, fragmentary, perspective detail of a centering pin having a modified, convex end according to an alternate embodiment of the improved tool, along with a screw according to an alternate embodiment of the improved fastener.
Figure 11:
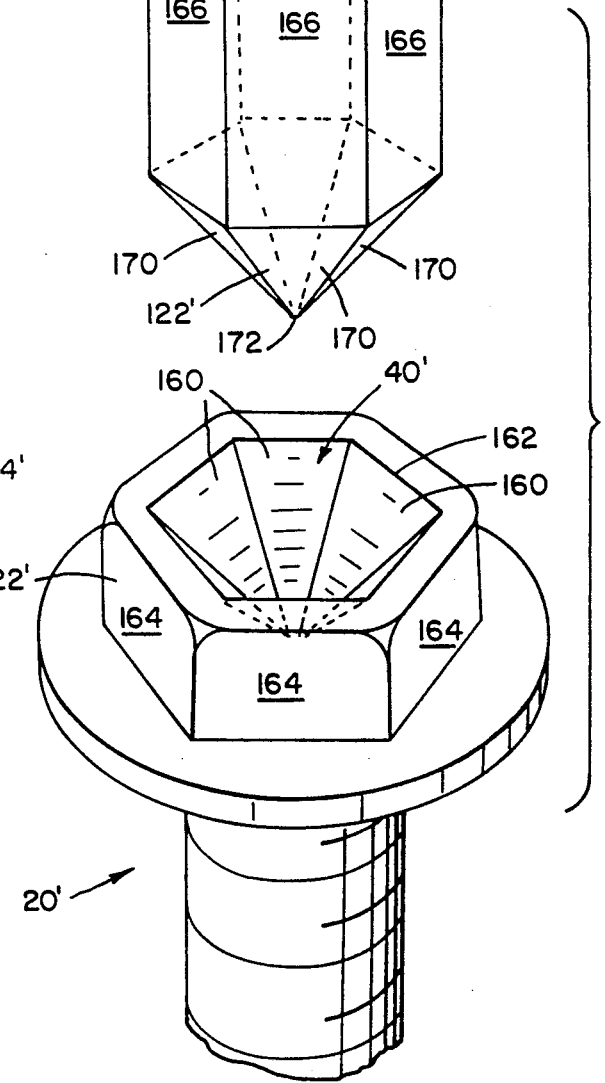
FIG. 11, on a smaller scale compared to that of FIG. 10, is an axial view looking upwardly at the centering pin and related components of the improved tool according to the alternate embodiment.

In FIGS. 10 and 11, primed reference numbers are used to designate elements that are similar or analogous to elements designated by similar, unprimed reference numbers in the other views.

An alternate embodiment of the improved fastener provided by means of this invention is constituted by means of a screw 20' similar to the screw 20, except that the concave recess 40' defined within the head 22' of the screw 20' has six substantially triangular surfaces 160, which are arranged in a regular array about the axis of the screw 20'. Such surfaces 160 define a continuous, upper edge 162, which conforms to a regular hexagon having each of six respective sides disposed parallel to an adjacent one of six flat surfaces 164 of the screw head 22'.

An alternate embodiment of the improved tool provided by means of this invention is constituted by means of a stand-up screw gun 10' similar to the screw gun 10, except for the centering pin 120' and the annular retainer 128', which is fitted into the tubular extension 114' in such a manner that the retainer is frictionally held by means of the tubular extension 114'.

The centering pin 120' is hexagonal in cross-section, except for an annular rib (not shown) similar to the annular rib 126 used in the screw gun 10. The annular retainer 128' is shaped complementarily, as shown in FIG. 11, so that the centering pin 120' rotates conjointly with the socket 110', which is hexagonal when viewed axially. The centering pin 120' and the socket 110' are oriented similarly in a rotational sense, whereby each of six axially extending, flat surfaces 166 defined upon the centering pin 120' is disposed parallel to an adjacent one of six flat surfaces 168 defined by means of the socket 110' within the tubular extension 108'.

The convex end 122' of the centering pin 120' conforms generally to the concave recess 40 defined within the head 22' of the screw 20' and has six substantially triangular facets 170 arranged in a regular array about the axis of the centering pin 120'. The facets 170 converge toward the axis of the centering pin 120' and conform substantially to a pyramid having a rectangular hexagonal base. The convex end 122' has a small, blunt tip 172.

Because the centering pin 120' rotates conjointly with the socket 110', the centering pin 120' orients the screw 20' in such a manner that the socket 110' and the head 22' of the screw 20' are oriented similarly in a rotational sense, when the convex end 122' of the centering pin 120' is axially fitted into the concave recess 40' defined within the head 22' of the screw 20'. Thus, when the socket 110' and the screw head 22' are oriented similarly in a rotational sense as well as centered relative to each other, the socket 110' can be axially fitted over the screw head 22' without interference.

Various modifications may be made in the improved tool or in the improved fastener without departing from the scope and spirit of this invention. It is therefore to be understood that within the scope of the appended claims, the present invention may be practiced otherwise than as specifically described herein.

We claim:

1. A fastener, comprising:
   a head; and
   a shank having a threaded portion;
   said head and said shank defining a longitudinal axis through said fastener;
   said head having an external portion which has a configuration which is non-circular when viewed axially so as to adapt said head for driving coaction with a driving member having a socket shaped similarly to said external portion of said head so that said socket can be axially fitted over and about said external portion of said head so as to define a driving relationship therewith; and
   said head has a recess extending axially into said head, and a continuous, upper edge portion having a configuration which comprises a regular polygon and which separates said external portion of said head from said axially extending recess of said head, said axially extending recess having a polygonal configuration for cooperating with a similarly configured centering pin fixedly associated with said socket of said driving member so as to guide said centering pin of said driving member from a radially offset position with respect to said longitudinal axis of said fastener toward said longitudinal axis of said fastener and thereby center said socket and said head relative to each other, and for defining an additional driving coaction with said centering pin of said driving member in addition to, and in conjunction with, said driving coaction defined between said socket and said external portion of said head of said fastener.

2. The fastener as set forth in claim 1, wherein:
said non-circular head has the configuration of a regular polygon when viewed axially.

3. The fastener as set forth in claim 2, wherein:
said upper edge portion of said recess of said head comprising said regular polygon comprises a plurality of sides defining said regular polygon; and
said non-circular head having said configuration of a regular polygon comprises a plurality of sides defining said regular polygon wherein said sides of said polygon defining said head of said fastener are disposed parallel to said sides of said polygon defining said upper edge portion of said recess.

4. The fastener of claim 2, wherein:
said polygonal head is hexagonal when viewed axially.

5. The fastener of claim 3 wherein the shank has a drilling tip.

6. The fastener as set forth in claim 3, wherein:
said upper edge portion of said recess of said head of said fastener comprising said regular polygon has the configuration of a regular hexagon which is defined by means of six sides; and
said hexagonal head comprises six sides wherein said six sides of said hexagonal head are disposed parallel to said six sides of said regular hexagon of said upper edge portion of said recess of said head of said fastener.

7. The fastener of claim 1 wherein the concave recess has a plurality of substantially triangular surfaces, which are arranged in a regular array about the axis of the fastener, and which define said continuous, upper edge conforming to said regular polygon.

8. The fastener as set forth in claim 4, wherein:
said plurality of substantially triangular surfaces comprises six substantially triangular surfaces predeterminedly angled with respect to each other so as to define an inverted pyramid having a regular hexagonal base.

9. The fastener as set forth in claim 8, wherein:
said upper edge portion of said recess of said head of said fastener comprising said regular polygon comprises said regular hexagonal base which is defined by means of six sides wherein each one of said six sides comprises one side of said six substantially triangular surfaces; and
said non-circular head has the configuration of a regular hexagon comprising six sides wherein said six sides of said regular hexagon defining said head of said fastener are disposed parallel to said six sides of said regular hexagon defining said upper edge portion of said recess.

10. The fastener of claim 1 wherein the head is hexagonal when viewed axially, and wherein the concave recess comprises six wall surfaces defining said continuous, upper edge conforming to said regular hexagon.

11. The fastener as set forth in claim 5, wherein:
said upper edge portion of said recess of said head comprising said regular hexagon comprises six sides defining said regular hexagon; and
said non-circular head having said configuration of a regular hexagon comprises six sides defining said regular hexagon wherein said sides of said regular hexagon defining said head of said fastener are disposed parallel to said sides of said regular hexagon defining said upper edge portion of said recess.

12. The fastener as set forth in claim 5, wherein:
each one of said six wall surfaces has the configuration of a triangle; and
said triangular wall surfaces are arranged in a regular array about said axis of said fastener so as to define an inverted pyramid having a regular hexagonal base.

13. The fastener as set forth in claim 12, wherein:
said upper edge portion of said recess of said head comprising said regular hexagon comprises six sides which respectively define base sides of said triangular wall surfaces; and
said non-circular head having said configuration of a regular hexagon comprises six sides defining said regular hexagon wherein said side sides of said regular hexagon defining said head of said fastener are disposed parallel to said six sides of said regular hexagon defining said upper edge portion of said recess.

* * * * *